United States Patent
Howes

(10) Patent No.: US 8,655,665 B2
(45) Date of Patent: *Feb. 18, 2014

(54) SYSTEM AND METHOD FOR MULTI LEVEL TRANSCRIPT QUALITY CHECKING

(71) Applicant: Nuance Communications, Inc., Burlington, MA (US)

(72) Inventor: Simon L. Howes, Monroe, CT (US)

(73) Assignee: Nuance Communications, Inc., Burlington, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/739,127

(22) Filed: Jan. 11, 2013

(65) Prior Publication Data

US 2013/0179171 A1    Jul. 11, 2013

Related U.S. Application Data

(63) Continuation of application No. 11/133,583, filed on May 20, 2005, now Pat. No. 8,380,510.

(51) Int. Cl.
- *G10L 21/00* (2013.01)
- *G10L 15/00* (2013.01)
- *G10L 15/26* (2006.01)
- *G10L 25/00* (2013.01)

(52) U.S. Cl.
USPC ............................ 704/270; 704/235; 704/277

(58) Field of Classification Search
USPC .................................. 704/235, 243, 260, 277
See application file for complete search history.

(56) References Cited

U.S. PATENT DOCUMENTS

| | | | |
|---|---|---|---|
| 5,033,077 A | | 7/1991 | Bergeron et al. |
| 6,308,158 B1 | | 10/2001 | Kuhnen et al. |
| 6,356,634 B1 | | 3/2002 | Noble, Jr. |
| 6,513,151 B1 | | 1/2003 | Erhardt et al. |
| 6,535,849 B1 | * | 3/2003 | Pakhomov et al. ............ 704/235 |
| 6,865,258 B1 | * | 3/2005 | Polcyn ........................ 379/88.01 |

(Continued)

FOREIGN PATENT DOCUMENTS

WO    WO 01/01391 A1    1/2001

OTHER PUBLICATIONS

International Search Report from International Application No. PCT/US06/19040.
Canadian Office Action from Canadian Application No. 2,608,566.

(Continued)

*Primary Examiner* — Richemond Dorvil
*Assistant Examiner* — Olujimi Adesanya
(74) *Attorney, Agent, or Firm* — Wolf, Greenfield & Sacks, P.C.

(57) ABSTRACT

Methods and systems for multi level quality checking of transcripts are disclosed. The method includes the steps of searching subsets of metadata associated with the transcripts, identifying a group of transcripts having at least one particular subset of metadata, selecting a number of transcripts from the group of identified transcripts corresponding to a predetermined percentage, identifying a group of correctionists having a proper set of characteristics to correct the selected transcripts by matching the identified subsets of metadata associated with the transcripts with characteristics of correctionists, providing the transcripts and any voice files from which the transcripts derive to the selected correctionists, and, following correction, updating the subsets of metadata associated with the transcripts to include subsets of metadata pertaining to the voice files from which the transcripts were derived, any transcriptionist who transcribed the transcripts, or any correctionist who corrected the transcripts.

15 Claims, 2 Drawing Sheets

(56) References Cited

U.S. PATENT DOCUMENTS

| | | |
|---|---|---|
| 6,910,005 B2 | 6/2005 | Bartosik |
| 6,922,466 B1 | 7/2005 | Peterson et al. |
| 7,236,932 B1 | 6/2007 | Grajski |
| 7,447,636 B1 | 11/2008 | Schwarts et al. |
| 7,836,412 B1 * | 11/2010 | Zimmerman ............... 715/827 |
| 2002/0077833 A1 | 6/2002 | Arons et al. |
| 2003/0046350 A1 | 3/2003 | Chintalapati et al. |
| 2004/0049385 A1 * | 3/2004 | Lovance et al. ............ 704/260 |
| 2004/0064317 A1 | 4/2004 | Othmer et al. |
| 2004/0083105 A1 * | 4/2004 | Jaroker ....................... 704/260 |
| 2004/0088162 A1 | 5/2004 | He et al. |
| 2005/0010407 A1 | 1/2005 | Jaroker |
| 2005/0251679 A1 | 11/2005 | Narayanan |
| 2006/0149558 A1 | 7/2006 | Kahn et al. |

OTHER PUBLICATIONS

Extended European Search Report from European Application No. 06760002.3.

Summons to attend oral proceedings pursuant to Rule 115(1) EPC.

* cited by examiner

SYSTEM AND METHOD FOR MULTI LEVEL TRANSCRIPT QUALITY CHECKING

RELATED APPLICATIONS

This application claims the benefit under 35 U.S.C. §120, as a continuation, of U.S. application Ser. No. 11/133,583, entitled "SYSTEM AND METHOD FOR MULTI LEVEL TRANSCRIPT QUALITY CHECKING" filed on May 20, 2005, which is herein incorporated by reference in its entirety.

BACKGROUND OF THE INVENTION

The present invention relates generally to a system and method for multi level quality checking of transcripts of voice files. Although an envisioned application for the present invention is for the transcription and quality assurance of medical reports, it will be appreciated that the application of the present invention is not limited to the field of medicine.

In a typical hospital setting, a doctor creates a voice file by dictating a medical report on to a hospital's database. The voice file is then transcribed by a transcriptionist. The transcriptionist listens to a playback of the voice file and types a transcript of the voice file as playback proceeds. Alternately, speech recognition software may first operate on the voice file before transcription; the transcriptionist is then provided with the output of the speech recognition software as well as the voice file and listens to a playback of the voice file while making corrections to the output of the speech recognition software. In either event, the result of transcription is a transcript of the voice file.

To be certain that the transcription of the voice file was accurate, quality assurance (QA) is required. The quality assurance of transcripts is done by correctionists. Typically, a correctionist listens to a playback of the voice file while proofreading the corresponding transcript and corrects any discrepancies between the playback and the transcript.

Today's situation concerning the quality assurance of transcripts of recorded voice generally presents one of two undesirable choices. The first possibility is to perform the all of the QA work in the United States using an organization's in-house QA department or outsourcing to a US-based transcription company. Advantageously, the expected quality of such an American transcription is high; 96% correctness is an accepted industry norm. Additionally, US-based transcriptionists commonly possess a high degree of skill and commitment to accomplishing highly accurate QA work. A principal drawback to performing QA of transcripts in the United States is expense. Typically, US-based transcription companies charge fifteen cents per line for transcription and QA services.

The alternative to performing QA work on transcripts in the US is to have the QA work done offshore in countries with large numbers of highly educated English-speaking people. Such countries include India, the Philippines, and Trinidad, among others. A considerable advantage to offshore QA work is the lower labor cost in offshore countries. In India, for example, the cost of transcription is typically one-half of one cent per line plus approximately five or six cents per line for quality assurance—a total savings of about 60% compared to the cost of domestic QA. Moreover, today's technology ensures that moving QA work offshore is facile, safe, and inexpensive—internet bandwidth costs have become increasingly less expensive and secure, encrypted connections have become the norm. A principal drawback to offshore QA work is its perceived low reputation for quality. The result of an organization's low opinion of offshore QA work is low confidence in the accuracy of an offshore quality assured transcript which may outweigh the cost benefit of moving the QA work offshore. It is contemplated that a workflow utilizing several levels of quality assurance blending both offshore and domestic QA resources will maximize the advantages and minimize the drawbacks of domestic and offshore QA work. Lower level QA work may be carried out offshore with the attendant benefit of cost savings. With each level of QA, the level of confidence in the accuracy of transcripts will increase depending on the skill level of the person performing the QA work. As the level of confidence increases, an increasingly smaller number of transcripts will require further QA work to achieve an acceptable confidence level. High-level or top-level work may then be performed either domestically or in a higher-cost offshore country on a modest sample of transcripts with the attendant benefit of high accuracy. Such a method will have the benefit of producing transcripts of similar accuracy to wholly domestic transcripts at a lower cost.

Therefore, an object of the present invention is to provide a method and system of multi level quality checking of transcripts with high accuracy at reduced cost. Another object of the present invention is to provide a method and system for facilitating the transcription of voice files prior to subjecting the transcripts of the voice files to a multi level transcript checking process.

These and other objects will be apparent to those skilled in the art.

SUMMARY OF THE INVENTION

In a first aspect, the present invention includes a method for assuring the quality, at multiple levels, of transcripts of voice files. Specifically, the present invention is directed towards a method for multi level quality checking of transcripts of voice files having the steps of identifying subsets of metadata associated with the transcripts, identifying a group of transcripts having one or more particular subset(s) of metadata, referencing a predetermined percentage of the group of identified transcripts that will be corrected, selecting a number of transcripts from among the group of identified transcripts corresponding to the percentage, identifying a group of correctionists having a proper set of characteristics to correct the selected transcripts by matching the identified subsets of metadata associated with the transcripts with characteristics of correctionists and selecting one or more correctionists from the group of proper correctionists to correct the transcripts, providing the transcripts and any voice files from which the transcripts derive to the selected correctionists, and, following correction, updating the subsets of metadata associated with the transcripts to include subsets of metadata pertaining to the voice files from which the transcripts were derived, any transcriptionist who transcribed the transcripts, or any correctionist who corrected the transcripts. In a second aspect, the present invention includes an optional method for facilitating the transcription of voice files prior to subjecting the transcripts deriving from those voice files to the multi level transcript checking method. Specifically, the present invention is optionally directed to a method for facilitating the transcription of voice files for later quality assurance having the steps of identifying subsets of metadata associated with voice files, identifying a group of voice files having a particular subset of metadata, identifying a group of transcriptionists having a proper set of characteristics to transcribe the identified group of voice files by matching the identified subsets of metadata associated with the voice files with characteristics of transcriptionists and selecting one or more transcriptionists from among the group of proper transcriptionists to transcribe the voice files, providing the voice files to the selected transcriptionists, and, following transcription, writing subsets of metadata to be associated with the resultant transcripts of the voice files to include subsets of metadata pertaining to the voice files or the transcriptionist who transcribed the voice files.

In a third aspect, the present invention includes a computer system for implementing the methods. Specifically, the present invention is directed to a computer system having a computer with a computer storage medium and a computer program code mechanism embedded in the computer storage medium for causing a computer to identify subsets of metadata associated with voice files or transcripts of voice files, select transcriptionists or correctionists to operate on the voice files or the transcripts based on workflow rules, and provide voice files or transcripts via an internet connection to a web-based trans-net client for transcription or a web-based QA client for correction; a database in electronic communication with the computer code mechanism containing stored voice files or transcripts of the voice files, characteristics of transcriptionists or correctionists, and the workflow rules including definitions of the subsets of metadata associated with the voice files or the transcripts; and a web-based quality assurance client operable to allow a correctionist via an internet connection to access the voice files and corresponding transcripts of the voice files stored on the database for correction.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

DETAILED DESCRIPTION OF THE INVENTION

The present invention will now be described more fully as it applies to all embodiments. The present invention relates to a method of checking, at several levels, transcripts of voice files. The present invention also relates to system for implementing the method of multi level quality checking. The system of the present invention is capable of operating on conventional computer systems and computerized devices, an example of which is provided below as it relates to the preferred embodiment. The method is carried out by first searching subsets of metadata associated with transcripts of voice files residing on a database. A group of transcripts having at least one particular subset of metadata associated with the transcripts is identified. A predetermined percentage of the group of identified transcripts that will be corrected is referenced. A number of transcripts from among the group of identified transcripts corresponding to the predetermined percentage are selected. A group of correctionists having a proper set of characteristics to correct the selected transcripts is identified by matching the identified subsets of metadata associated with the transcripts with characteristics of correctionists. The transcripts and any voice files from which the transcripts derive are provided to the selected correctionists via an internet connection. Following correction, the subsets of metadata associated with the transcripts are updated to include subsets of metadata pertaining to the voice files from which the transcripts were derived, any transcriptionist who transcribed the transcripts, or any correctionist who corrected the transcripts. A computer system for use with implementing the method also is described.

The present invention will now be described more fully with reference to the Figures in which an embodiment of the present invention is shown. The subject matter of this disclosure may, however, be embodied in many different forms and should not be construed as being limited to the embodiment set forth herein.

Figure 1:
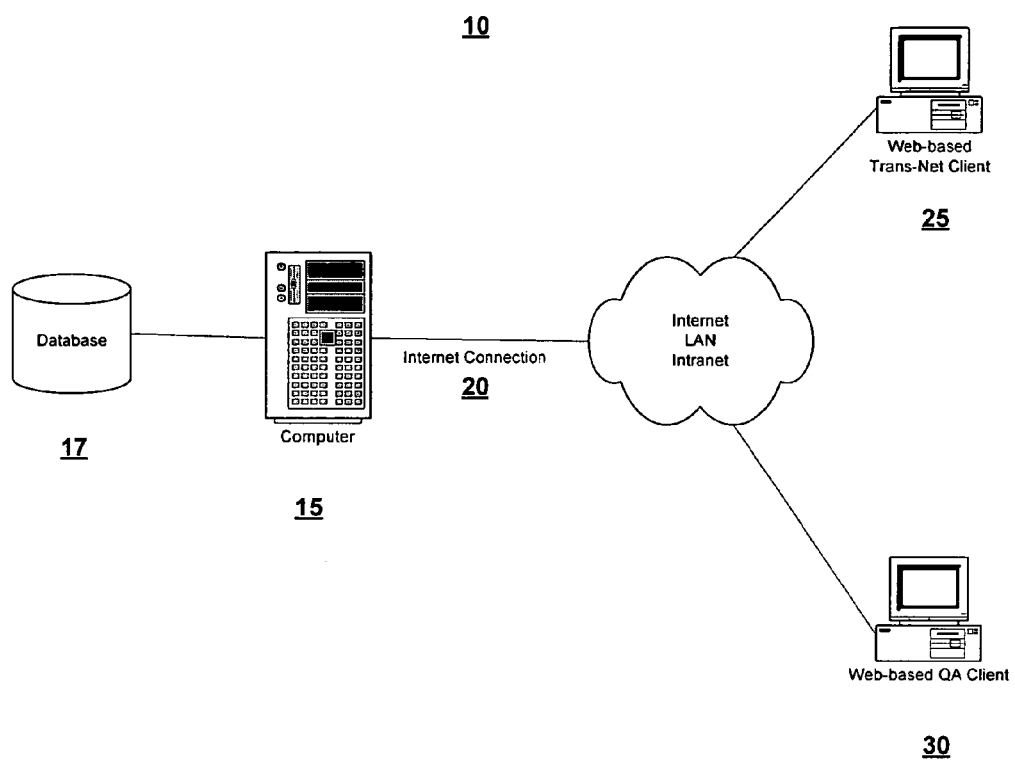
FIG. 1 is schematic illustration of a computer system for use with implementing the method of multi level quality transcript checking of the present invention.

Referring now to the drawings, wherein like reference numerals designate identical or corresponding parts throughout the several views, FIG. 1 is a schematic illustration of a computer system 10 for use with implementing a method multi level quality checking of the present invention. A computer 15 electronically connected to a database 17 and having an internet connection 20 implements the method of the present invention. The computer 15 houses a computer storage medium and a computer program code mechanism embedded in the computer storage medium for causing the computer 15 to identify subsets of metadata associated with a voice file or the corresponding transcript and assign the voice file or the transcript to a transcriptionist through a web-based trans-net client 25 (if there is no corresponding transcript) or a correctionist through a web-based QA client 30 (if there is a corresponding transcript). In electronic communication with the computer code mechanism is a database 17 containing workflow rules, stored voice files or transcripts, and characteristics of transcriptionists or correctionists. Transcriptionists may access voice files stored on the database 17 from any location through the web-based trans-net client 25, which connects to the computer 15 via an internet connection 20. Correctionists may access assigned voice files and the corresponding transcripts of those voice files stored on the database 17 from any location through the web-based QA client 30, which connects to the computer 15 via an internet connection 20. It is contemplated that the internet connection 20 may be through the Internet or another internet communications network such as a local area network or a corporate intranet.

As stated above, the system 10 includes at least one computer storage medium. Examples of computer storage media are compact discs, hard disks, floppy disks, tape, magneto-optical disks, PROMs (EPROM, EEPROM, Flash EPROM), DRAM, SRAM, SDRAM, and the like.

Figure 2:
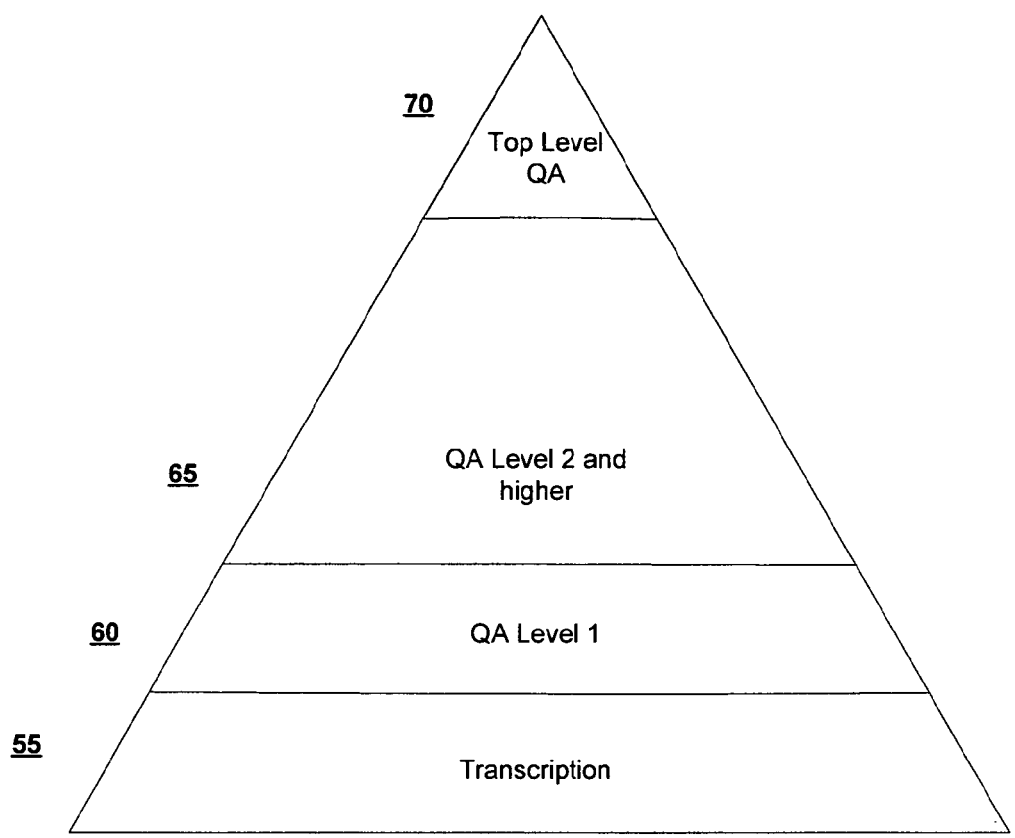
FIG. 2 is a diagram of the multi level quality checking hierarchy of the present invention.

With reference to FIG. 2, a hierarchy of multi level quality assurance 50 is shown for implementation with computer system 10. The hierarchy 50 is pyramid-shaped and is comprised of levels that become narrower as the level increases. Each level within the hierarchy encompasses a range of confidence factors possessed by transcriptionists or correctionists. Higher levels in the workflow pyramid indicate increasing confidence in the accuracy of transcripts in those levels due to the increasing skill level of transcriptionists or correctionists of those levels. Also, the decreasing base width of each higher level in the pyramid represents the lower number of voice file transcripts in higher levels that require higher-level QA checking.

The base level, transcription level 55, is an optional feature of the system and represents the transcription of a voice file by a transcriptionist. Based on the skill of the transcriptionist performing the transcription, transcripts created in the transcription level 55 are placed in Level 1 QA 60 or higher.

Level 1 QA 60 indicates the level with the lowest range of confidence factors, such as those assigned to the lowest-skilled transcriptionists or correctionists. Level 2 QA 65 and higher levels represent the increasing confidence factors possessed by increasingly skilled transcriptionists or correctionists. It is contemplated that the higher skill possessed by increasingly experienced transcriptionists or correctionists allows the size of the sample of transcripts in the pyramidal hierarchy that require further QA to become smaller as the apex is neared. There may be as many levels between Level 1 QA 60 and top level QA 70 as desired. At the apex, top level QA 70 represents the highest level of transcript quality assurance, such as that possessed by the most skilled transcriptionists or correctionists. Transcripts that have reached top level QA 70 are provided to the organization(s) that provided the original voice files. It is contemplated that the top level QA 70 may represent the QA department of the organization that provided the original voice file(s).

The database 17 stores workflow rules, voice files or transcripts thereof, and characteristics of transcriptionists or correctionists. The workflow rules define the levels of quality assurance, a confidence factor range associated with each level of quality assurance, and subsets of metadata. The subsets of metadata defined by the workflow rules may include, without limitation, a voice file's creator, the creator's organization or any suborganization thereof, a creation date, a subject of the voice file or transcript, a type of voice file or transcript, an identity of the transcriptionist who transcribed the transcript, an identity of any correctionist who corrected on the transcript, a confidence factor assigned to any transcriptionist or correctionist who operated on the transcript, a QA level corresponding to the transcriptionist's or correctionist's confidence factor, or a date on which the transcript was transcribed or corrected.

The workflow rules also determine the percentage of transcripts in each level that will receive further QA checking at a higher level. For example, the workflow rules may be configured such that 25% of the transcripts for organization A stored on the database 17 that were checked by correctionists having a QA level of 2 will be selected for further checking at QA level 3. Or, for example, the workflow rules may be configured such that 5% of the transcripts for organization B stored on the database 17 that created by transcriptionists having a QA level of 3 will be selected for further checking at QA level 4. The workflow rules may also determine a percentage of files having a certain subset of metadata other than the QA level of the transcriptionist or correctionist that will receive further QA checking at a higher level. For example, the workflow rules may be configured such that 3% of the transcripts of psychiatric reports stored on the database 17 will be selected for further checking at a higher QA level. Optionally, the workflow rules may specify that the selection of transcripts for higher level checking will be done at random from within a group of transcripts up to the number corresponding to the percentage.

All of the workflow rules stored on the database 17 may be configured to suit the needs of the person or organization providing voice files for transcription or correction. For example, Franklin Hospital may define the confidence factor range for QA level 2 to be between 51 and 80 inclusive and that 15% of the QA level 2 transcripts will receive further checking, whereas Grant Hospital may define QA level 2 to be between 41 and 60 inclusive and that 25% of the QA level 2 transcripts will receive further checking. As discussed above, voice files from the providing organization or person are stored on the database 17. The voice files have metadata associated with them. The voice file metadata may include, without limitation, information relating to the voice file's creator, the creator's organization or any subgroup thereof, the creation date, the subject of the voice file, or the type of voice file. For example, a voice file resulting from a doctor dictating a medical report may have metadata indicating that the doctor dictating the report was Dr. Anja Stenstrom of the Ophthalmology department of Grant Hospital and that the report is a patient medical history of patient David Brainard dictated on Mar. 19, 2005.

The database 17 also stores a transcript of any voice file stored on the database 17 if a transcriptionist or speech recognition software has created one. The transcript, like the corresponding voice file, has metadata associated with it. In addition to the voice file metadata listed above, the transcript metadata may include, without limitation, a type of transcript, a subject of the transcript, the identity of the transcriptionist or any correctionist who operated on the transcript, a confidence factor assigned to the transcriptionist or correctionist, or the date on which the transcript was transcribed or corrected.

The database 17 further stores characteristic data for transcriptionists or correctionists. The characteristics of transcriptionists or correctionists may include, without limitation, a correctionist's quality assurance level, a confidence factor to be associated with a transcriptionist's or correctionist's output, a set of organizations or subgroups thereof on whose voice files or corresponding transcripts the transcriptionist or correctionist is permitted to operate, or a set of voice file or transcript types on which the transcriptionist or correctionist is permitted to operate. For example, characteristic data for a correctionist may state that he/she performs QA work on Level 1 transcripts, has a confidence factor of 0, may only operate on transcripts for a hospital's neurological department, and may only operate on transcripts dealing with patient medical histories. Optionally, the multi level quality checking method may include a process for facilitating transcription of voice files stored on the database 17 prior to commencing a process for facilitating correction of transcripts stored on the database 17. The computer code mechanism within the computer 15 begins a transcription facilitation process by reading and identifying subsets of metadata associated with voice files stored on the database 17. The subsets of metadata are defined by the workflow rules stored on the database 17. The defined subsets of metadata may include, without limitation, a voice file's creator, an organization to which the creator belongs or any suborganization thereof, a creation date, a subject of the voice file, or a type of voice file. For example, the subsets of metadata associated with a voice file V read by the computer code mechanism may indicate that V is a discharge report for patient Dora Goldberg dictated by Dr. Maria Ramirez of the Cardiology department of St. Luke's Medical Center on Jul. 9, 2005.

The computer code mechanism searches transcriptionist characteristics stored on the database 17 and identifies a group of proper transcriptionists to transcribe the voice files by matching transcriptionists having the proper transcriptionist characteristics to transcribe voice files with a particular subset of metadata with the identified subsets of metadata. The computer code mechanism then selects transcriptionists from the identified group. For example, the computer code mechanism reading the metadata associated with voice file U determines, based on the defined subsets of metadata stored on the database 17, that U is a discharge report. The computer code mechanism will then search the transcriptionist characteristics stored on database 17, identify a group of available transcriptionists with permission to transcribe voice files of discharge reports, and select a transcriptionist from the identified group to transcribe U.

Transcriptionists log on to the system 10 through a web-based trans-net client 25 that communicates with the database 17 within the computer 15 via an internet connection 20. Upon login, assignments are made available to transcriptionists through the web-based trans-net client 25. For example, when transcriptionist T logs in to the system 10 through the web-based trans-net client 25, the computer code mechanism will provide to T only voice files of cardiology reports and post-operative reports because T's characteristics permit him to transcribe only those types of voice files.

When the transcriptionist has completed transcription of the voice file, the resultant transcript of the voice file is stored on the database 17. The computer code mechanism writes into the transcript new transcript metadata pertaining to the transcriptionist's characteristics. The new subsets of the transcript's metadata written by the computer code mechanism are defined in the workflow rules stored on database 17 and may include, without limitation, all of the metadata subsets present in voice files, as well as the subject of the transcript, the type of transcript, the identity of a transcriptionist, a confidence factor assigned to the transcriptionist, a QA level corresponding to the transcriptionist's confidence factor, or the date on which the transcript was transcribed. For example, the subsets of transcript metadata of transcript R identified by the computer code mechanism may indicate that R is the transcript of an autopsy report for cancer victim George Gonzales dictated by Dr. Howard Meier of the Pathology department of St. Jude's Medical Center on May 2, 2005 and that it was transcribed by Padma Rao, who has a confidence factor of 75 that corresponds to QA level 3, on May 3, 2005. Or, for example, the subsets of transcript metadata of transcript Y identified by the computer code mechanism may indicate that Y is the transcript of a discharge report for heart patient Victor Reynolds dictated by Dr. Jane Nguyen of the Cardiology department of Northwestern Memorial Hospital on Oct. 1, 2005 and that it was transcribed by speech recognition software.

The computer code mechanism commences a process for facilitating correction of transcripts stored on the database 17. The computer code mechanism reads subsets of metadata associated with the transcripts and identifies subsets of the transcripts' metadata. The subsets of the transcripts' metadata identified by the computer code mechanism are defined in the workflow rules stored on database 17 and may include, without limitation, all of the metadata subsets present in voice files, as well as a subject of the transcript, a type of transcript, an identity of the transcriptionist, a confidence factor assigned to the transcriptionist, a QA level corresponding to the transcriptionist's confidence factor, a date on which the transcript was transcribed, an identity of any correctionist who corrected the transcript, a confidence factor assigned to the correctionist, a QA level corresponding to the correctionist's confidence factor, or any date on which any correctionist corrected the transcript. The computer code mechanism then identifies a group of transcripts having one or more desired subset(s) of metadata for correction. For example, if it is desired by the providing organization that transcripts in QA level 2 should undergo quality checking, the computer code mechanism will identify the group of transcripts in QA level 2 by searching the metadata associated with all transcripts residing on the database 17. Or, in another example, if it is desired by the providing organization that transcripts of discharge records should undergo quality checking, the computer code mechanism will identify the group of transcripts of discharge records by searching the metadata associated with all transcripts residing on the database 17. Or, in still another example, if it is desired by the providing organization that transcripts of autopsy reports in QA level 3 should undergo quality checking, the computer code mechanism will identify the group of transcripts of autopsy records in QA level 3 by searching the metadata associated with all transcripts residing on the database 17.

The computer code mechanism references the workflow rules stored on the database 17 to determine the predetermined percentage of transcripts in the appropriate QA level that will be provided to correctionists for further checking. For example, a confidence level of 75 may indicate that a transcript is in QA level 2 and that 20% of the transcripts in QA level 2 will undergo further checking by higher level correctionists. The computer code mechanism may also reference the workflow rules stored in the database 17 to determine what percentage, if any, of transcripts with any other particular subset of metadata will be made available for correctionists. For example, the workflow rules may instruct the computer code mechanism to select 3% of all psychiatric reports for Morton Hospital stored on the database 17 and provide them to correctionists. The computer code mechanism selects for correction a number of transcripts having a particular QA level or other particular subset of metadata corresponding to the predetermined percentage set by the workflow rules. Those transcripts having a particular QA level or a particular subset of metadata identified by the computer code mechanism but not selected for correction in this step are elevated to top level QA 70. For example, if the workflow rules indicate that 20% of the transcripts for Can Hospital that have received Level 2 checking are to receive further checking at Level 3 and 50 transcripts on the database qualify, the computer code mechanism will select 10 of those transcripts for further correction at Level 3; the remaining 40 transcripts will be placed in top level QA 70. Optionally, it is contemplated that this selection may be done at random from among the qualifying transcripts.

The computer code mechanism then searches the correctionist characteristics stored on the database 17 and identifies a group of proper correctionists to correct the transcripts by matching correctionists having the proper transcriptionist characteristics to correct transcripts with a particular subset of metadata with the identified subsets of metadata. For example, the computer code mechanism reading the metadata associated with transcript D determines, based on the defined subsets of metadata stored on the database 17, that D is a QA level 2 discharge report. The computer code mechanism will then search the correctionist characteristics stored on database 17 for available QA level 2 correctionists with permission to correct transcripts of discharge reports and identify a group of available correctionists having the proper characteristics to correct D. If a transcript has no associated metadata, the computer code mechanism will provide the transcript to QA level 1 correctionists.

The computer code mechanism then selects correctionists from the identified group and provides the selected transcripts along with their corresponding voice files to the selected correctionists. For example, if the workflow rules instruct that 10% of the transcripts in QA level 2 for Hutchinson Medical Center will undergo further checking, the computer code mechanism will select 10% of the transcripts in QA level 2 for Hutchinson Medical Center on the database, identify a group of correctionists in QA level 2, and assign the selected transcripts to the group of selected correctionists. Optionally, the selection of correctionists from among the group of proper correctionists may be done at random.

Correctionists log on to the system 10 through a web-based QA client 30 that communicates with the database 17 within the computer 15 via an internet connection 20. Upon login, the computer code mechanism makes the selected transcripts available to the selected correctionists via the web-based QA client 30. For example, when correctionist C logs in to the system 10 through the web-based QA client 30, the computer code mechanism selects and assigns only QA level 1 transcripts of patient medical histories to C because C's characteristics stored on the database 17 permit her to transcribe only QA level 1 transcripts of patient medical histories. The computer code mechanism provides both the assigned transcripts and the voice files from which the transcripts derive to the correctionists over the internet connection 20 through the web-based QA client 30.

Following correction, the corrected transcript is stored on the database 17. The computer code mechanism writes into the transcript file new subsets of transcript metadata pertaining to the correctionist's characteristics. The new subsets of the transcript's metadata written by the computer code mechanism are defined in the workflow rules stored on database 17 and may include, without limitation, all of the metadata subsets present in voice files, as well as the subject of the transcript, the type of transcript, the identity of the transcriptionist, a confidence factor assigned to the transcriptionist, a QA level corresponding to the transcriptionist's confidence factor, the date on which the transcript was transcribed, the identity of the correctionist, a confidence factor assigned to the correctionist, a QA level corresponding to the correctionist's confidence factor, and the date on which the transcript was corrected. For example, the subsets of transcript metadata of transcript N written by the computer code mechanism may indicate that N is the transcript of a discharge report for patient Helen Hathaway dictated by Dr. Yu Ming of the Cardiology department of Northwestern Memorial Hospital on Jun. 10, 2005, that it was transcribed by Daniel Taylor, who has a confidence factor of 50 that corresponds to QA level 2, on Jun. 11, 2005, and that it was corrected by Silvia Cruz, who has a confidence factor of 95 that corresponds to top-level QA, on Jun. 12, 2005.

Eventually, every transcript will attain the top QA level 70. Once a transcript reaches the top QA level 70, the computer code mechanism may upload the transcript to the providing organization or person. It is envisioned that the top QA level 70 may represent the providing organization's in-house QA department.

It is therefore seen that through the implementation of a multi level transcript quality checking method on a computer system with an optional method of facilitating the transcription of voice files prior to implementation of the multi level transcription method, the present invention allows for high accuracy quality checking of transcripts at reduced cost, thereby accomplishing at least all of the stated objectives.

What is claimed is:

1. A method of multi level quality checking of transcripts of voice files comprising steps of:
    searching, via at least one computer system, metadata included in said transcripts of voice files, wherein each transcript is completed by a transcriptionist and wherein the metadata for each transcript comprises an indication of a confidence associated with the transcriptionist who completed that transcript;
    using the metadata associated with said transcripts, identifying, via the at least one computer system, a group of transcripts having a particular quality assurance level;
    selecting, via the at least one computer system, a subset of said group of identified transcripts to be corrected;
    identifying, via the at least one computer system, a group of correctionists having a proper set of characteristics to correct said selected subset of transcripts;
    providing, via the at least one computer system, said subset of transcripts and any voice files from which the subset of transcripts derive to correctionists within said group of correctionists; and
    following correction, updating, via the at least one computer system, metadata associated with said subset of transcripts to include metadata pertaining to said voice files from which said transcripts were derived, any transcriptionist who transcribed the transcripts, and/or any said correctionist who corrected said transcripts.

2. The method of claim 1, wherein said metadata included in said subset of transcripts comprise an identity of a creator of said voice file from which said transcript derives, a creation date for said voice file from which said transcript derives, an identity of an organization for which said transcript was created or a suborganization thereof, a type of transcript, a subject of the transcript, an identity of said transcriptionist who transcribed said voice file from which said transcript derives, an identity of any said correctionist who corrected said transcript, a quality assurance level associated with said transcript, a confidence factor associated with said transcriptionist or correctionist, and/or a transcription or correction date.

3. The method of claim 1, wherein the characteristics of said correctionists comprise a confidence factor to be associated with said correctionist, a quality assurance level corresponding to said correctionist's confidence factor, a set of organizations or suborganizations thereof on whose transcripts said correctionist is permitted to operate, and/or a set of transcript types on which said correctionist is permitted to operate.

4. The method of claim 1, further comprising the step of facilitating transcription of said voice files prior to the correction of said transcripts of said voice files, the step of facilitating transcription of said voice files further comprising the steps of:
    identifying voice file metadata associated with said voice files;
    identifying a group of said voice files having at least one particular subset of voice file metadata;
    identifying a group of said transcriptionists having a proper set of characteristics to transcribe said identified group of voice files by matching said at least one particular subset of voice file metadata associated with said voice files with characteristics of said transcriptionists; and
    providing said group of voice files to transcriptionists within the group of transcriptionists.

5. The method of claim 4, wherein said voice file metadata associated with said voice files comprise an identity of a voice file's creator, an identity of an organization for which the voice file was created or a suborganization thereof, a type of voice file, a subject of the voice file, and/or a creation date.

6. The method of claim 4, wherein said voice files are provided at random to transcriptionists within the group of transcriptionists.

7. The method of claim 1, wherein the characteristics of said correctionists comprise a confidence factor to be associated with said correctionists, a quality assurance level corresponding to said correctionist's confidence factor, a set of organizations or suborganizations thereof on whose said transcripts said correctionists is permitted to operate, and/or a set of transcript types on which said correctionists is permitted to operate.

8. The method of claim 1, wherein the subset of transcripts is selected at random based on a predetermined percentage.

9. The method of claim 1, wherein said transcripts are provided at random to said correctionists within the group of correctionists.

10. The method of claim 1, wherein any transcripts in the group of said identified transcripts that are not selected for correction are promoted to a top-level quality assurance level.

11. A multi level quality checking computer system for checking the accuracy of transcripts of voice files comprising:
- a computer with a computer storage medium configured with instructions to cause the computer to identify a subset of metadata included in a subset of the transcripts of voice files, the subset of the transcripts of voice files having a particular quality assurance level indicative of a confidence associated with one or more transcriptionists who completed the transcripts and the subset of metadata comprising metadata indicative of the particular quality assurance level, and select correctionists to operate on a predetermined percentage of the transcripts in the subset of the transcripts, the predetermined percentage being less than 100%, based on metadata workflow rules;
- a database, in electronic communication with said computer, storing said transcripts of said voice files, characteristics of said correctionists, and said workflow rules; and
- a web-based quality assurance client operable to allow said correctionists, via an internet connection, to access said transcripts for correction.

12. The system of claim 11, wherein the computer storage medium is further configured to cause the computer to identify subsets of voice file metadata included in voice files, select transcriptionists to operate on the voice files based on voice file metadata workflow rules, and to provide said voice files to the transcriptionists, and wherein the database further stores said voice files, characteristics of said transcriptionists, and said voice file metadata workflow rules, and wherein the system further comprises a web-based trans-net client operable to allow said transcriptionists to access, via said internet connection, said voice files stored on said database for transcription.

13. The system of claim 11, wherein said subsets of metadata included in said transcripts comprise an identity of an organization for which a transcript was created or a suborganization thereof, a type of transcript, a subject of a transcript, an identity of a correctionist who corrected a transcript, a confidence factor associated with the correctionist, a quality assurance level corresponding to the confidence factor, and/or a correction date.

14. The system of claim 11, wherein the characteristics of said correctionists comprise a confidence factor to be associated with a correctionist, a quality assurance level corresponding to said correctionist's confidence factor, a set of organizations or subgroups thereof on whose transcripts said correctionist is permitted to operate, and/or a set of transcript types on which said correctionist is permitted to operate.

15. The system of claim 11, wherein said metadata comprises data unrelated to a substance of the transcripts.

\* \* \* \* \*